United States Patent
Maejima et al.

(10) Patent No.: US 7,525,749 B2
(45) Date of Patent: Apr. 28, 2009

(54) DISK ARRAY APPARATUS AND DISK-ARRAY CONTROL METHOD

(75) Inventors: Mitsuru Maejima, Kawasaki (JP); Shoichi Murano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/412,956

(22) Filed: Apr. 28, 2006

(65) Prior Publication Data

US 2007/0171562 A1 Jul. 26, 2007

(30) Foreign Application Priority Data

Jan. 25, 2006 (JP) ............................... 2006-016832

(51) Int. Cl.
*G11B 19/02* (2006.01)
(52) U.S. Cl. ....................................................... 360/69
(58) Field of Classification Search ................. None
See application file for complete search history.

(56) References Cited

U.S. PATENT DOCUMENTS

| | | | | |
|---|---|---|---|---|
| 5,727,144 A | * | 3/1998 | Brady et al. .................. 714/6 |
| 5,828,583 A | * | 10/1998 | Bush et al. .................. 702/185 |
| 6,081,812 A | * | 6/2000 | Boggs et al. ................. 707/202 |
| 6,519,678 B1 | * | 2/2003 | Basham et al. ............... 711/112 |
| 6,598,174 B1 | * | 7/2003 | Parks et al. ..................... 714/6 |
| 6,816,980 B1 | * | 11/2004 | Fukuhara et al. ................ 714/4 |
| 6,915,448 B2 | * | 7/2005 | Murphy et al. .................. 714/6 |
| 6,948,102 B2 | * | 9/2005 | Smith ........................... 714/47 |
| 7,024,586 B2 | * | 4/2006 | Kleiman et al. .................. 714/7 |
| 7,133,966 B2 | * | 11/2006 | Sato et al. .................... 711/114 |
| 2003/0225970 A1 | * | 12/2003 | Harshemi .................... 711/114 |
| 2005/0216800 A1 | * | 9/2005 | Bicknell et al. .............. 714/718 |

FOREIGN PATENT DOCUMENTS

| | | |
|---|---|---|
| JP | 8-147112 | 6/1996 |
| JP | 11-345095 | 12/1999 |

* cited by examiner

*Primary Examiner*—K. Wong
(74) *Attorney, Agent, or Firm*—Staas & Halsey LLP

(57) ABSTRACT

A failure predicting unit predicts a failure in a hard disk device that forms a disk array. A data transferring unit transfers data from a failure-predicted hard disk device for which the failure is predicted by the failure predicting unit to a spare disk. A data deleting unit deletes the data from the failure-predicted hard disk device after the data transferring unit completes transferring the data.

8 Claims, 5 Drawing Sheets

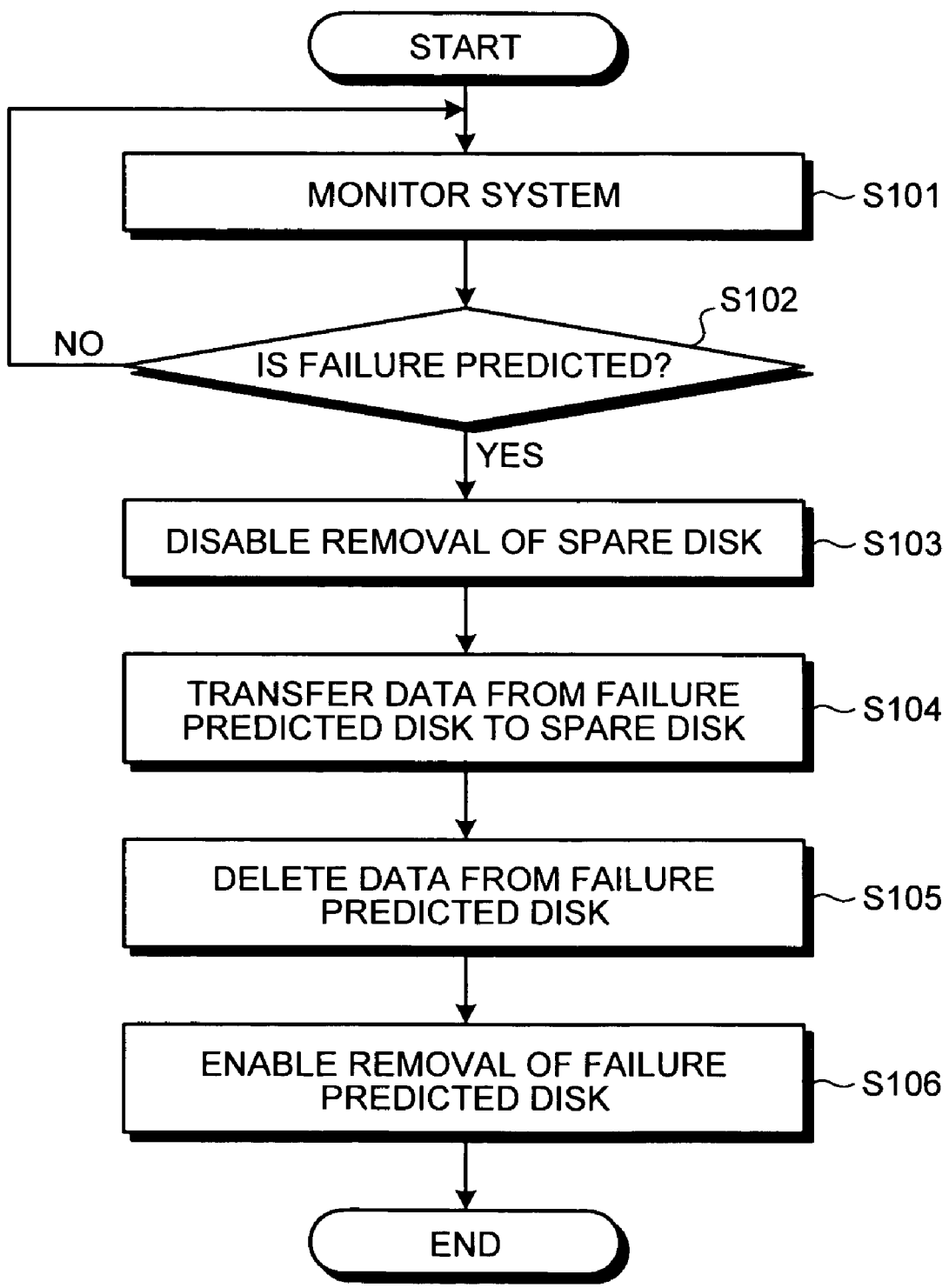

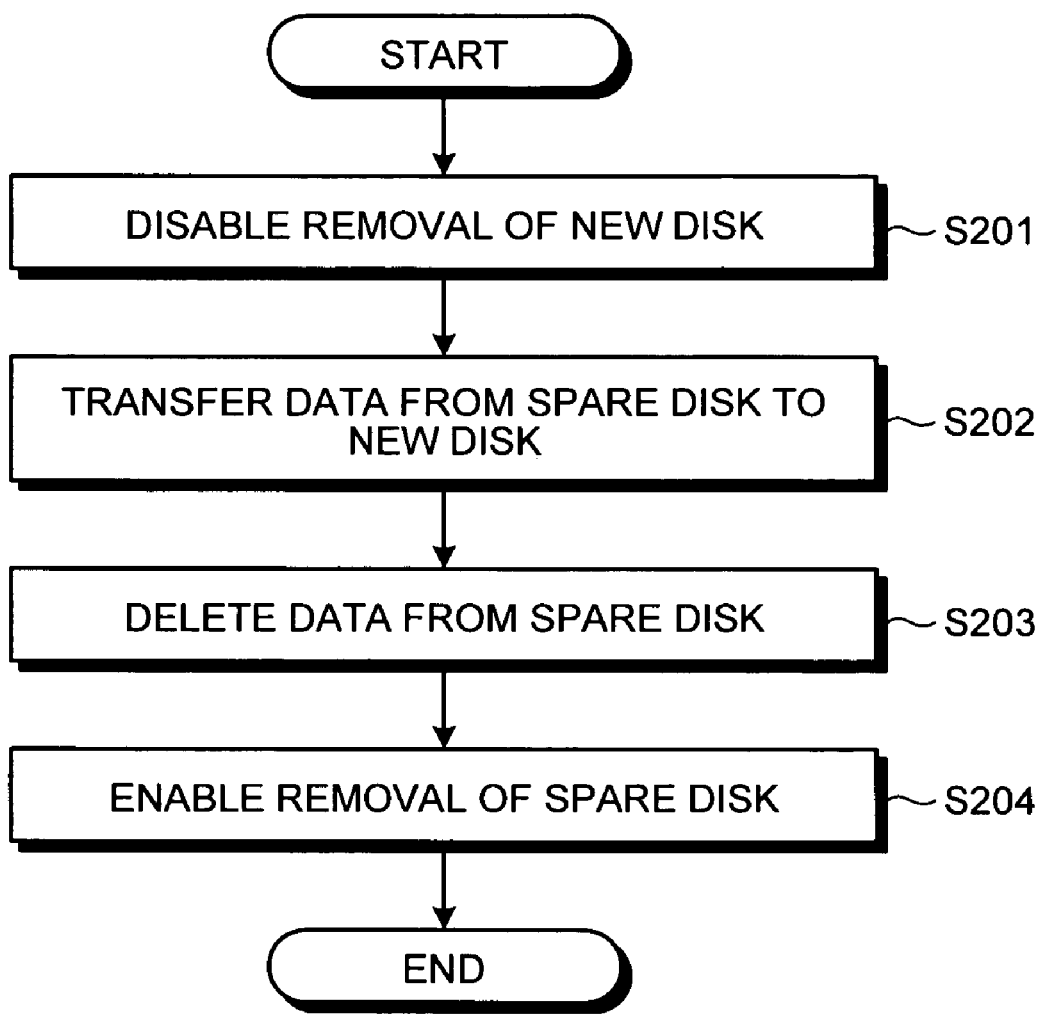

DISK ARRAY APPARATUS AND DISK-ARRAY CONTROL METHOD

BACKGROUND OF THE INVENTION

1. Field of the Invention

The present invention generally relates to a technology for securing high reliability by performing a preventive measure against a failure of a hard disk device and for assuring a rigorous data security in a disk array apparatus.

2. Description of the Related Art

A volume of data processed in a data processing system has become larger and larger and a disk array has been increasingly used as a storage device in the data processing system. The disk array can include a plurality of hard disk devices, which are grouped into a virtual hard disk device. Therefore, the disk array can realize a larger capacity.

In the disk array, data redundancy such as mirroring is generally obtained for securing reliability. The mirroring is a method of storing data in the hard disk devices. Due to the mirroring, even if one of the hard disk devices in the disk array gets damaged, processing of the data can be carried on by using data stored in another hard disk device.

A technique for securing reliability of the disk array is disclosed in Japanese Unexamined Patent Application Publication H11-345095. According to the technique, a disk array apparatus includes a group of hard disk devices (a disk array) and a spare disk. When a failure is predicted in one of the hard disk devices, data in a failure-predicted hard disk device is transferred to the spare disk. Then the spare disk can be grouped into the disk array.

However, above conventional technique has a problem regarding data security. When the failure-predicted hard disk device is removed from the disk array and replaced with a new hard disk device by a service engineer, the data remains in the failure-predicted hard disk device, which causes data-leakage from the failure-predicted hard disk device.

If there is an accident or a fraud on the failure-predicted hard disk device, confidential data such as trade secrets or customer information can be stolen from the failure-predicted hard disk device. Recently, an Act on the Protection of Personal Information has been enforced in Japan. There has been an increasing demand for securing data in companies or other entities. Therefore, a possibility of the data-leakage with the conventional technique is a critical problem.

SUMMARY OF THE INVENTION

It is an object of the present invention to at least solve the problems in the conventional technology.

A disk array apparatus according to one aspect of the present invention includes a failure predicting unit that predicts a failure in a hard disk device that forms a disk array; a data transferring unit that transfers data from a failure-predicted hard disk device for which the failure is predicted by the failure predicting unit to a spare disk; and a data deleting unit that deletes the data from the failure-predicted hard disk device after the data transferring unit completes transferring the data.

A disk-array control method according to another aspect of the present invention includes predicting a failure in a hard disk device that forms a disk array; transferring data from a failure-predicted hard disk device for which the failure is predicted at the predicting to a spare disk; and deleting the data from the failure-predicted hard disk device after transferring the data completed at the transferring.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart of a processing procedure for a process when the failure is predicted in the disk array apparatus shown in FIG. 3; and FIG. 5 is a flowchart of a processing procedure for a process when the failure of the disk array apparatus is recovered.

DETAILED DESCRIPTION OF THE PREFERRED EMBODIMENTS

Exemplary embodiments of the present invention are explained in detail below with reference to the accompanying drawings.

Figure 1:
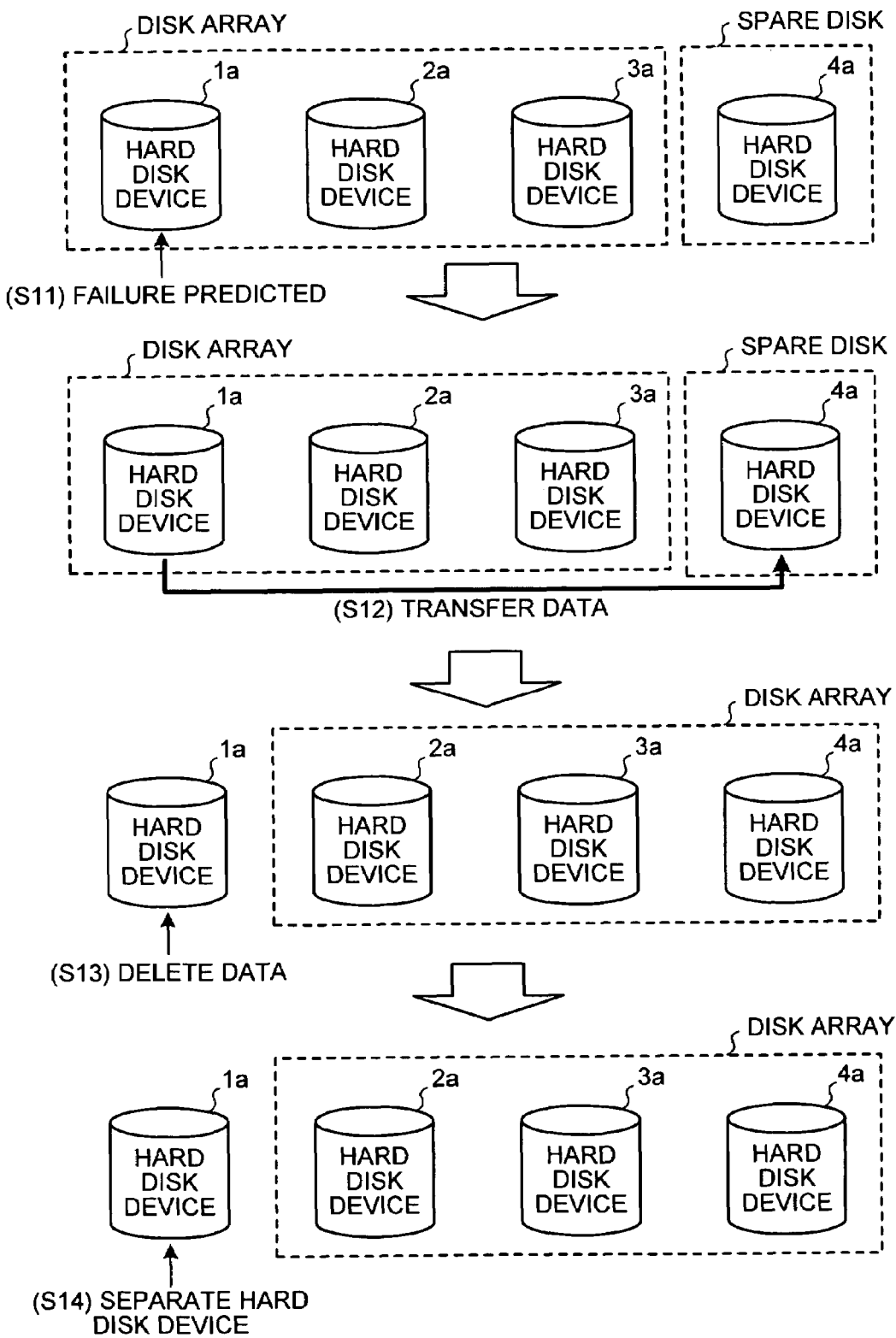
FIG. 1 is a schematic for explaining a concept of a disk-array control method according to an embodiment of the present invention.

FIG. 1 is a schematic for explaining a concept of a disk-array control method according to an embodiment of the present invention. In the disk-array control method according to the present embodiment, a disk array is formed by combining a plurality of hard disk devices, and at least one hard disk device is provided as a spare disk.

The disk array includes three hard disk devices $1a$ to $3a$. The hard disk devices $1a$ to $3a$ are grouped into a virtual hard disk device to be accessed by a data processor (not shown). The disk array is implemented as redundant arrays of independent disks (RAID)-0, RAID-1, and RAID-5, each of which has its own features.

For example, in the RAID-0, data can be distributed to each hard disk device in the disk array so that input-output processing of the data can be concurrently executed in the hard disk devices. As a result, a performance of the input-output processing of the data-file increases. However, data redundancy cannot be obtained in RAID-0. In the RAID-1, data is stored in one or more hard disk devices. Storing the data in one or more hard disk devices is called as mirroring. Due to the mirroring, data can be recovered even when one of the hard disk devices in the disk array is broken.

The disk array apparatus according to the present embodiment is not limited to a specific RAID. Any class of RAID can be used in accordance with an intended use. Moreover, the disk array can include one or more disk arrays.

In the example shown in FIG. 1, a hard disk device $4a$ is provided as the spare disk. Although the spare disk is always in an active state, it is not used for storing data in a normal operation. A plurality of the spare disks can also be provided.

It is assumed that a failure is predicted in the hard disk device $1a$ (step S11). The failure can be predicted by various methods. For example, it can be determined that a failure has occurred when writing errors or reading errors occur more than predetermined times.

When a failure is predicted in any hard disk devices of the disk array apparatus, data in the failure-predicted hard disk device is transferred to the spare disk. In the example shown in FIG. 1, data in the hard disk device 1a is copied to the hard disk device 4a (step S12).

In this manner, by transferring the data to the spare disk at a stage when the failure is predicted in the hard disk device, it becomes possible to take a preventive measure against the failure, and as a result, reliability of the disk array profoundly increases.

After the data is completely transferred from the failure-predicted hard disk device to the spare disk, the hard disk devices 2a to 4a are grouped into the disk array. Then, the failure-predicted hard disk device 1a is replaced with a new hard disk device.

Even after the replacement, the data, which may include confidential data, still remains in the hard disk device 1a. Therefore, there is a possibility of leakage of the confidential data from the hard disk device 1a. Generally, a service engineer dispatched by a manufacturer collects the hard disk device 1a and deletes the data. However, if there is an accident or a fraud during the collection or the deletion, again there is a possibility of leakage of the confidential data.

According to the present embodiment, the data in the failure-predicted hard disk device is automatically deleted once the data-transfer is completed. In the example shown in FIG. 1, the data in the hard disk device 1a is deleted (step S13). After the deletion, the hard disk device 1a is removed (step S14).

In this manner, by automatically deleting the data, the data security can profoundly increase and data-leakage can be surely prevented.

Another way for deleting the data can be that the service engineer manually deletes the data. However, there is still a possibility that the data gets leaked before the service engineer arrives. If the data is automatically deleted right after the data is transferred, data-leakage can be surely prevented.

Recently, a hard disk device has higher and higher capacity and stores more and more data. As a result, it takes more and more time to delete the data. If the data is automatically deleted right after the data-transfer, the data can be efficiently deleted before the service engineer arrives.

The failure-predicted hard disk device is replaced with a new hard disk device after the failure-predicted hard disk device is removed from the disk array. Then, the new hard disk device can be used as the spare disk. On the other hand, the new hard disk device can be rearranged in the disk array and the hard disk device 4a is set as the spare disk again.

Figure 2:
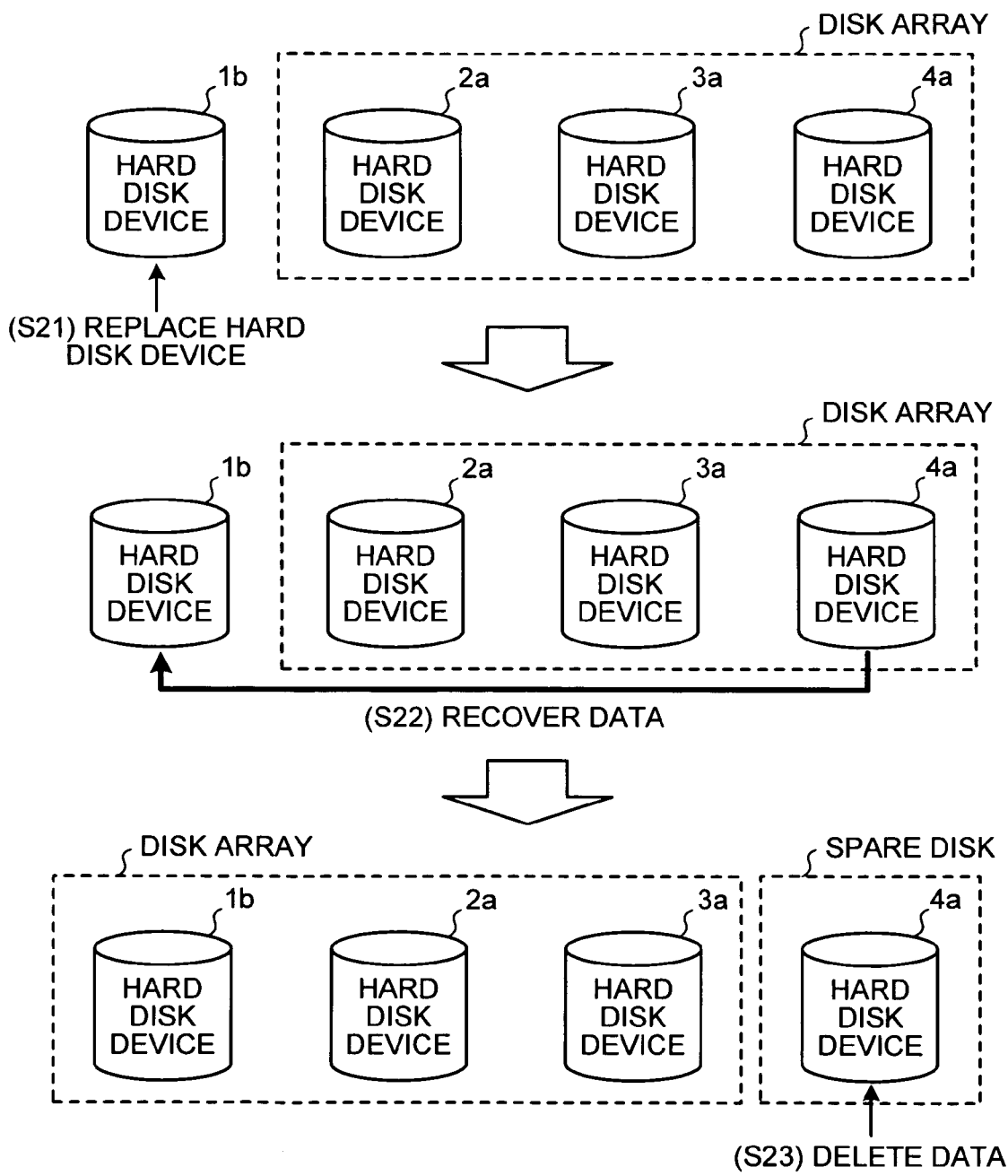
FIG. 2 is a schematic for explaining a concept of a process after a failure of the disk array apparatus is restored.

FIG. 2 is a schematic for explaining a concept of a process after the failure of the disk array apparatus is restored. The hard disk device 1a is replaced with a hard disk device 1b (step S21). When setting the hard disk device 4a as the spare disk, the data in the hard disk device 4a transferred from the hard disk device 1a is copied to the hard disk device 1b (step S22).

Once the data is copied to the hard disk device 1b, the hard disk devices 1b, 2a, and 3a are grouped into the disk array. Then, the hard disk device 4a is set as the spare disk.

In this state, the data still remains in the hard disk device 4a, which may cause data-leakage. According to the present embodiment, the data in the hard disk device 4a is automatically deleted right after the data-copy is completed (step S23).

Figure 3:
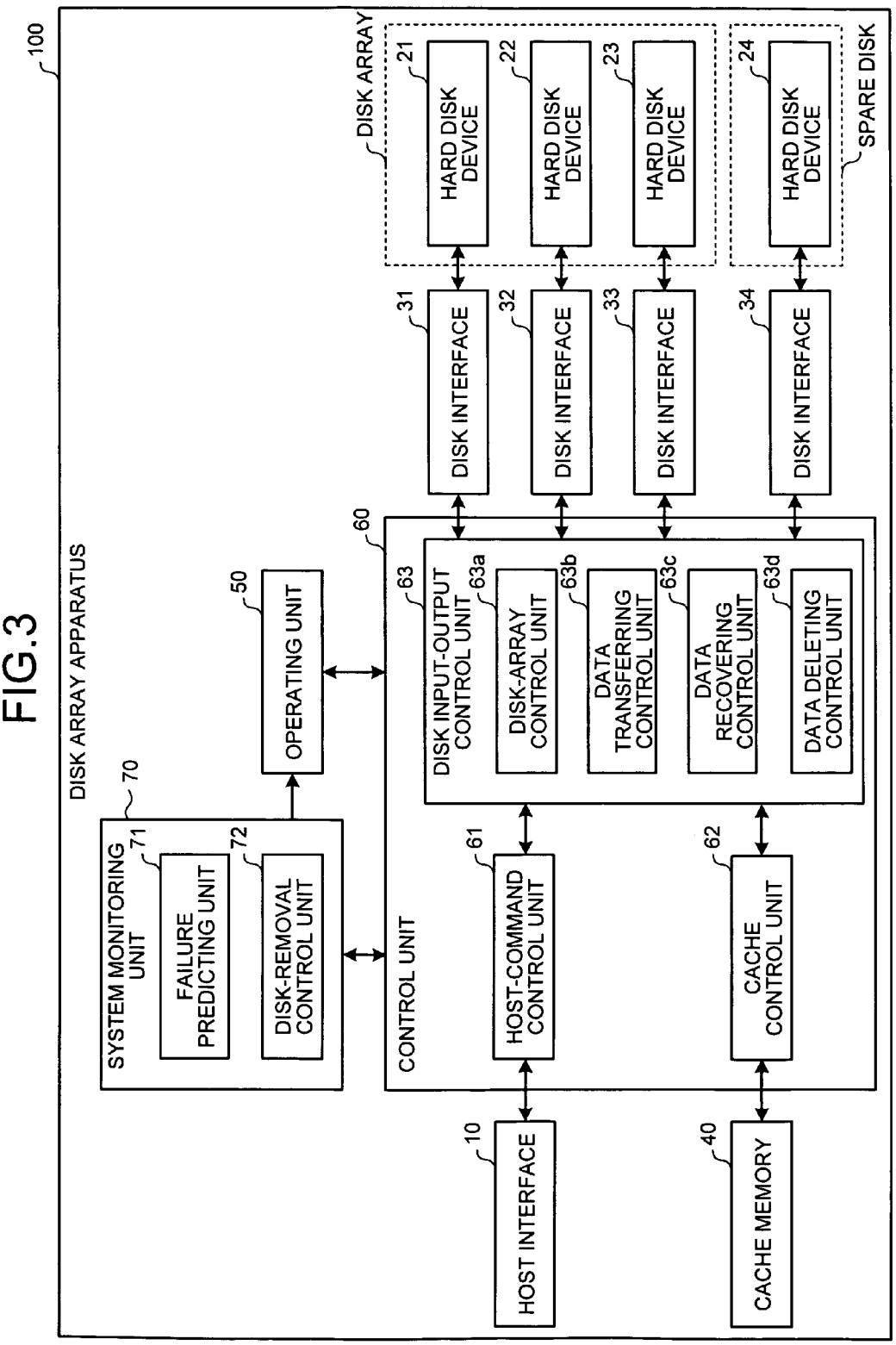
FIG. 3 is a block diagram of a disk-array apparatus according to the present embodiment.

FIG. 3 is a block diagram of a disk array apparatus 100 according to the present embodiment. The disk array apparatus 100 includes a host interface 10, hard disk devices 21 to 24, disk interfaces 31 to 34, a cache memory 40, an operating unit 50, a control unit 60, and a system monitoring unit 70.

The host interface 10 receives a command from an information processing apparatus (not shown) to which the disk array apparatus 100 is connected. Then the host interface 10 transfers the command to the control unit 60 and relays a response between the control unit 60 and the data processor. The disk array apparatus 100 and the information processing apparatus are connected using various connecting methods, such as small computer system interface (SCSI) or fiber channel.

The hard disk devices 21 to 24 are physical devices. The disk interfaces 31 to 34 functions as interfaces between the hard disk devices 21 to 24 and the control unit 60. Although four hard disk devices for the disk array apparatus 100 are shown in FIG. 3, the number of hard disk devices is not limited to four.

A part of the hard disk devices 21 to 24 are grouped into a disk array and the rest is set as the spare disk. Although the hard disk devices 21 to 23 are grouped into the disk array and the hard disk device 24 is the spare disk in the example shown in FIG. 3, there is no particular restriction in the grouping of the hard disk devices.

The cache memory 40 retains the data copied from the hard disk devices 21 to 24 for speeding up data input-output processing. The operating unit 50 is used by the service engineer for setting up the disk array apparatus 100. The operating unit 50 includes an input unit (not shown), such as a keypad, and a display unit (not shown), such as a liquid crystal display.

The control unit 60 controls the disk array apparatus 100. The control unit 60 includes a host-command control unit 61, a cache control unit 62, and a disk input-output control unit 63. The host-command control unit 61 interprets a command received at the host interface 10. Then the host-command control unit 61 transfers the command to the disk input-output control unit 63 and relays a response between the disk input-output control unit 63 and the host interface 10.

The cache control unit 62 controls the cache memory 40 so as to minimize data traffic on the hard disk devices 21 to 24. As a result, a performance of the input-output processing improves. The disk input-output control unit 63 controls input of data in and output of data from the hard disk devices 21 to 24. The disk input-output control unit 63 includes a disk-array control unit 63a, a data transferring unit 63b, a data recovering unit 63c, and a data deleting unit 63d.

The disk-array control unit 63a controls the hard disk devices in the disk array. The disk-array control unit 63a can be implemented as the RAID-0, the RAID-1, or the RAID-5, based on predetermined settings.

The data transferring unit 63b transfers, when a failure is predicted in any one of the hard disk devices forming the hard disk array, data from a failure-predicted hard disk device to a spare disk, and implements a preventive measure against the failure.

Once the data is transferred, the failure-predicted hard disk device is replaced with a new hard disk device.

The data recovering unit 63c copies the data from the spare disk to the new hard disk device after replacing the failure-predicted hard disk device. The data-copy can be automatically initiated by detecting the replacement of the failure-predicted hard disk device in the disk array apparatus 100. Alternately, the service engineer can initiate the data-copy by using the operating unit 50.

The data deleting unit 63d deletes the data from the failure-predicted hard disk device after the data is transferred from the failure-predicted hard disk device to the spare disk. The data deleting unit 63d also deletes the data from the spare disk after the data is copied from the spare disk to the new hard disk device.

Various methods can be used for deleting the data from the hard disk devices. For example, a formatting function is generally available in the hard disk devices and can be used for deleting the data at relatively high speed. Alternately, by deleting management information of a file system, such as node information and directory information, the data in the hard disk device can be made unreadable easily and immediately.

The data can be deleted from the hard disk devices at the same time while the data transferring unit 63b and the data recovering unit 63c are copying the data to the spare disk and the new hard disk device.

The system monitoring unit 70 monitors status of the control unit 60 to confirm status of each unit in the disk array apparatus 100. The system monitoring unit 70 controls units according to the status. The system monitoring unit 70 includes a failure predicting unit 71 and a disk-removal control unit 72.

The failure predicting unit 71 predicts the failure in the hard disk devices 21 to 24. If the failure is predicted, the failure predicting unit 71 informs information relating to the failure predicted hard disk device to the data transferring unit 63b. The failure can be determined, for example, that a failure has occurred when writing errors or reading errors occur more than predetermined times.

The disk-removal control unit 72 allows or prohibits removal of the hard disk devices 21 to 24. The hard disk devices 21 to 24 support hot-swap and the hard disk devices 21 to 24 are electrically removed during an operation of the disk array apparatus 100. However, the data gets damaged if the hard disk devices are removed during the data-copy. Therefore, the disk-removal control unit 72 prohibits the removal of the hard disk devices 21 to 24 when the hard disk devices 21 to 24 are in operation.

The disk-removal control unit 72 also prohibits removal of the spare disk in which the data is stored. When the data transferring unit 63b or the data recovering unit 63c copies the data, the data remains in the new hard disk device and the spare disk until the data deleting unit 63d deletes the data. If the spare disk is removed before the data is completely deleted, the data-leakage can occur. Therefore, the disk-removal control unit 72 prohibits the removal of the spare disk for preventing the data-leakage.

FIG. 4 is a flowchart of a processing procedure for a process when the failure is predicted in the disk array apparatus 100. The system monitoring unit 70 monitors the status of the disk array apparatus 100 (step S101). If a failure is not predicted (NO in step S102), the system monitoring unit 70 continues monitoring.

If a failure is predicted in the hard disk devices by the failure predicting unit 71 (YES in step S102), the disk-removal control unit 72 prohibits removal of the spare disk (step S103). In this state, the disk-removal control unit 72 also prohibits removal of the failure-predicted hard disk device. Then, the data transferring unit 63b copies the data from the failure-predicted hard disk device to the spare disk (step S104).

Once the data transferring unit 63b completes the data-copy to the spare disk, the data deleting unit 63d deletes the data from the failure-predicted hard disk device (step S105). After the data is deleted, the disk-removal control unit 72 allows the removal of the failure-predicted hard disk device (step S106).

FIG. 5 is a flowchart of a processing procedure for a process when the failure of the disk array apparatus 100 is recovered, showing a process performed after the failure-predicted hard disk device is replaced with a new hard disk device.

The disk-removal control unit 72 prohibits the removal of the failure-predicted hard disk device (step S201). In this state, the disk-removal control unit 72 also prohibits the removal of the spare disk. Then, the data recovering unit 63c copies the data from the spare disk to the new hard disk device (step S202).

Once the data recovering unit 63c completes the data-copy to the new hard disk device, the data deleting unit 63d deletes the data from the spare disk (step S203). After the data is deleted, the disk-removal control unit 72 allows the removal of the spare disk (step S204).

The disk array apparatus 100 can be included in an information processing apparatus. Furthermore, functions of the disk array apparatus 100 can be implemented in disk-array control software. The disk-array control software can be stored in a storage unit of the information processing apparatus. Then, the disk-array control software can be retrieved by the information processing apparatus and extracted to a memory. As a result, the disk-array control software can be used as the disk array apparatus 100.

According to an embodiment of the present invention, the data in the hard disk devices of the disk array apparatus can be surely secured by deleting the data from the failure-predicted hard disk device after the data is transferred from the failure-predicted hard disk to the spare disk.

Furthermore, according to an embodiment of the present invention, the data can be surely secured by deleting the data from the spare disk after the data is transferred from the spare disk to the new hard disk device.

Moreover, according to an embodiment of the present invention, the data can be surely secured by prohibiting removal of the failure-predicted hard disk device until the data is completely deleted from the failure-predicted hard disk device.

Furthermore, according to an embodiment of the present invention, the data can be surely secured by prohibiting removal of the spare disk until the data is completely deleted from the spare disk.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A disk array apparatus comprising:
   a failure predicting unit that predicts a failure in a hard disk device arranged in a disk array;
   a data transferring unit that transfers data from a failure-predicted hard disk device for which the failure is predicted by the failure predicting unit to a spare disk; and
   a data recovering unit that copies the data from the spare disk to a new hard disk device that replaced the failure-predicted hard disk device; and
   a data deleting unit that deletes the data stored on the failure-predicted hard disk device after the data transferring unit completes transferring the data, and deletes the data stored on the spare disk after the data recovering unit completes copying the data.

2. The disk array apparatus according to claim 1, further comprising:
   a disk-removal control unit that prohibits, when the data transferring unit starts transferring the data, removal of the failure-predicted hard disk device until the data deleting unit completes deleting the data stored on the failure-predicted hard disk device.

3. The disk array apparatus according to claim 2, wherein the disk-removal control unit prohibits, before the data transferring unit starts transferring the data, removal of the spare disk.

4. The disk array apparatus according to claim 1, further comprising:

a disk-removal control unit that prohibits, when the data recovering unit starts copying the data, removal of the spare disk until the data deleting unit completes deleting the data stored on the spare hard disk device.

5. The disk array apparatus according to claim 4, wherein the disk-removal control unit prohibits, before the data recovering unit starts copying the data, removal of the new hard disk device.

6. The disk array apparatus according to claim 1, wherein the data deleting unit deletes the data by formatting the failure-predicted hard disk device.

7. The disk array apparatus according to claim 6, wherein the data deleting unit deletes management information of a file system stored in the failure-predicted hard disk device prior to formatting the failure-predicted hard disk device.

8. A disk-array control method comprising:

predicting a failure in a hard disk device arranged in a disk array;

transferring data from a failure-predicted hard disk device for which the failure is predicted during the predicting to a spare disk;

copying the data from the spare disk to a new hard disk device that replaced the failure-predicted hard disk device; and deleting the data stored on the failure-predicted hard disk device after transferring the data completed during the transferring, and deleting the data stored on the spare disk after the copying the data is completed during the copying.

* * * * *